United States Patent [19]
Arimilli et al.

[11] Patent Number: 6,122,691
[45] Date of Patent: Sep. 19, 2000

[54] APPARATUS AND METHOD OF LAYERING CACHE AND ARCHITECTURAL SPECIFIC FUNCTIONS TO PERMIT GENERIC INTERFACE DEFINITION

[75] Inventors: Ravi Kumar Arimilli, Austin; John Steven Dodson, Pflugerville; Jerry Don Lewis, Round Rock; Derek Edward Williams, Austin, all of Tex.

[73] Assignee: International Business Machines Corporation, Armonk, N.Y.

[21] Appl. No.: 09/224,105

[22] Filed: Jan. 4, 1999

Related U.S. Application Data

[62] Division of application No. 08/839,445, Apr. 14, 1997, Pat. No. 5,937,172.

[51] Int. Cl.[7] .................................................. G06F 13/00
[52] U.S. Cl. ........................ 710/105; 710/129; 395/500; 711/140
[58] Field of Search .................................. 710/1, 11, 62, 710/63, 105, 129; 395/500; 711/100, 202, 122, 154, 140

[56] References Cited

U.S. PATENT DOCUMENTS

| | | | |
|---|---|---|---|
| 4,926,363 | 5/1990 | Nix | 702/120 |
| 5,175,829 | 12/1992 | Stumpf et al. | 712/203 |
| 5,276,902 | 1/1994 | Nakatani et al. | 712/6 |
| 5,408,627 | 4/1995 | Strik et al. | 711/151 |
| 5,537,575 | 7/1996 | Michelsen et al. | 711/135 |
| 5,557,769 | 9/1996 | Bailey et al. | 711/146 |
| 5,598,550 | 1/1997 | Shen et al. | 711/146 |
| 5,748,985 | 5/1998 | Kanai | 711/130 |
| 5,751,975 | 5/1998 | Gillespie et al. | 710/126 |
| 5,751,983 | 5/1998 | Abramson et al. | 712/216 |
| 5,774,683 | 6/1998 | Gulik | 710/126 |

FOREIGN PATENT DOCUMENTS 2256512 of 0000 United Kingdom.

*Primary Examiner*—Xuan M. Thai
*Attorney, Agent, or Firm*—Daniel E. Venglarik; Andrew J. Dillon

[57] ABSTRACT

Cache and architectural functions within a cache controller are layered and provided with generic interfaces. Layering cache and architectural operations allows the definition of generic interfaces between controller logic and bus interface units within the controller. The generic interfaces are defined by extracting the essence of supported operations into a generic protocol. The interfaces themselves may be pulsed or held interfaces, depending on the character of the operation. Because the controller logic is isolated from the specific protocols required by a processor or bus architecture, the design may be directly transferred to new controllers for different protocols or processors by modifying the bus interface units appropriately.

20 Claims, 5 Drawing Sheets

APPARATUS AND METHOD OF LAYERING CACHE AND ARCHITECTURAL SPECIFIC FUNCTIONS TO PERMIT GENERIC INTERFACE DEFINITION

This is a division of application Ser. No. 08/839,445, filed Apr. 14, 1997, U.S. Pat. No. 5,937,172.

RELATED APPLICATIONS

The present invention is related to the subject matter of the following commonly assigned copending United States patent applications, each filed Apr. 14, 1997: Ser. No. 08/839,442, now pending (Docket No. AT9-97-292) entitled "Method of Layering Cache and Architectural Specific Functions"; Ser. No. 08/834,115, now pending, (Docket No. AT9-97-293) entitled "Method of Layering Cache and Architectural Specific Functions to Expedite Multiple Designs"; Ser. No. 08/834,114, now U.S. Pat. No. 5,978,871, (Docket No. AT9-97-294) entitled "Method of Layering Cache and Architectural Specific Functions for Splitting Operations"; Ser. No. 08/839,443, now U.S. Pat. No. 5,909,561, (Docket No. AT9-97-194) entitled "Method of Layering Cache and Architectural Specific Functions to Facilitate Design Extension"; and Ser. No. 08/839,441, now pending, (Docket No. AT9-97-195) entitled "Method of Layering Cache and Architectural Specific Functions to Promote Operation Symmetry." The content of the above-mentioned copending applications is incorporated herein by reference.

BACKGROUND OF THE INVENTION

1. Technical Field

The present invention relates in general to cache controllers in data processing systems and in particular to cache controllers for caches in data processing system. Still more particularly, the present invention relates to layering cache and architectural specific functions within a cache controller for a cache in a data processing system to facilitate definition of generic interfaces which may be translated to specific bus architectures.

2. Description of the Related Art

Data processing systems which utilize a level two (L2) cache typically include a cache controller for managing transactions affecting the cache. Such cache controllers are conventionally implemented on a functional level, as depicted in FIG. 5. For example, a cache controller 502 may include logic 504 for maintaining the cache directory, logic 506 for implementing a least recently used (LRU) replacement policy, logic for managing reload buffers 508, and logic for managing store-back buffers 510. In traditional implementations, the cache is generally very visible to these and other architectural functions typically required for cache controllers, with the result that cache controller designs are specific to a particular processors such as the PowerPC™, Alpha™, or the x86 family of processors.

In addition to being processor-specific, cache controllers are generally also bus-specific. That is, cache controller implementations are typically specific to protocols governing transactions on the bus between the processor(s) and the cache controller(s). In fact, actions within the cache controller are initiated by bus operations. Thus, the cache controller is closely coupled in both design and operation to the specific buses connected to the cache controller.

Processors employed in data processing systems of the type discussed generally support a significant number of cache management instructions, such as a flush command, data cache block store, etc. Support for these instructions is typically implemented over the cache logic, substantially complicating the cache controller design requirements by imposing special cases for different instructions.

One problem with the prior art approach to implementing cache controllers is the virtual impossibility of defining a generic interface between the cache controller logic and a bus interface unit to a bus. Such a generic interface would be useful since it would allow the cache controller logic to be reused when revising the overall cache controller design for operation with a different processor or bus architecture. Under the prior art approach, the cache controller logic cannot be simply reused independent of any bus interface unit within the cache controller.

It would be desirable, therefore, to implement a cache controller design which permits definition of a generic interface between the cache controller logic and a bus interface unit for the cache controller. It would also be advantageous if the cache controller design simultaneously facilitated reuse of the cache controller logic. Finally, it would be advantageous for the cache controller design to permit implementation of generic interfaces which may be customized depending on the characteristics of particular bus operations.

SUMMARY OF THE INVENTION

It is therefore one object of the present invention to provide an improved cache controller for a data processing system.

It is another object of the present invention to provide an improved cache controller having layered cache and architectural specific functions.

It is yet another object of the present invention to provide a generic interface between the cache controller logic and a bus interface unit within the cache controller.

The foregoing objects are achieved as is now described. Cache and architectural functions within a cache controller are layered and provided with generic interfaces. Layering cache and architectural operations allows the definition of generic interfaces between controller logic and bus interface units within the controller. The generic interfaces are defined by extracting the essence of supported operations into a generic protocol. The interfaces themselves may be pulsed or held interfaces, depending on the character of the operation. Because the controller logic is isolated from the specific protocols required by a processor or bus architecture, the design may be directly transferred to new controllers for different protocols or processors by modifying the bus interface units appropriately.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
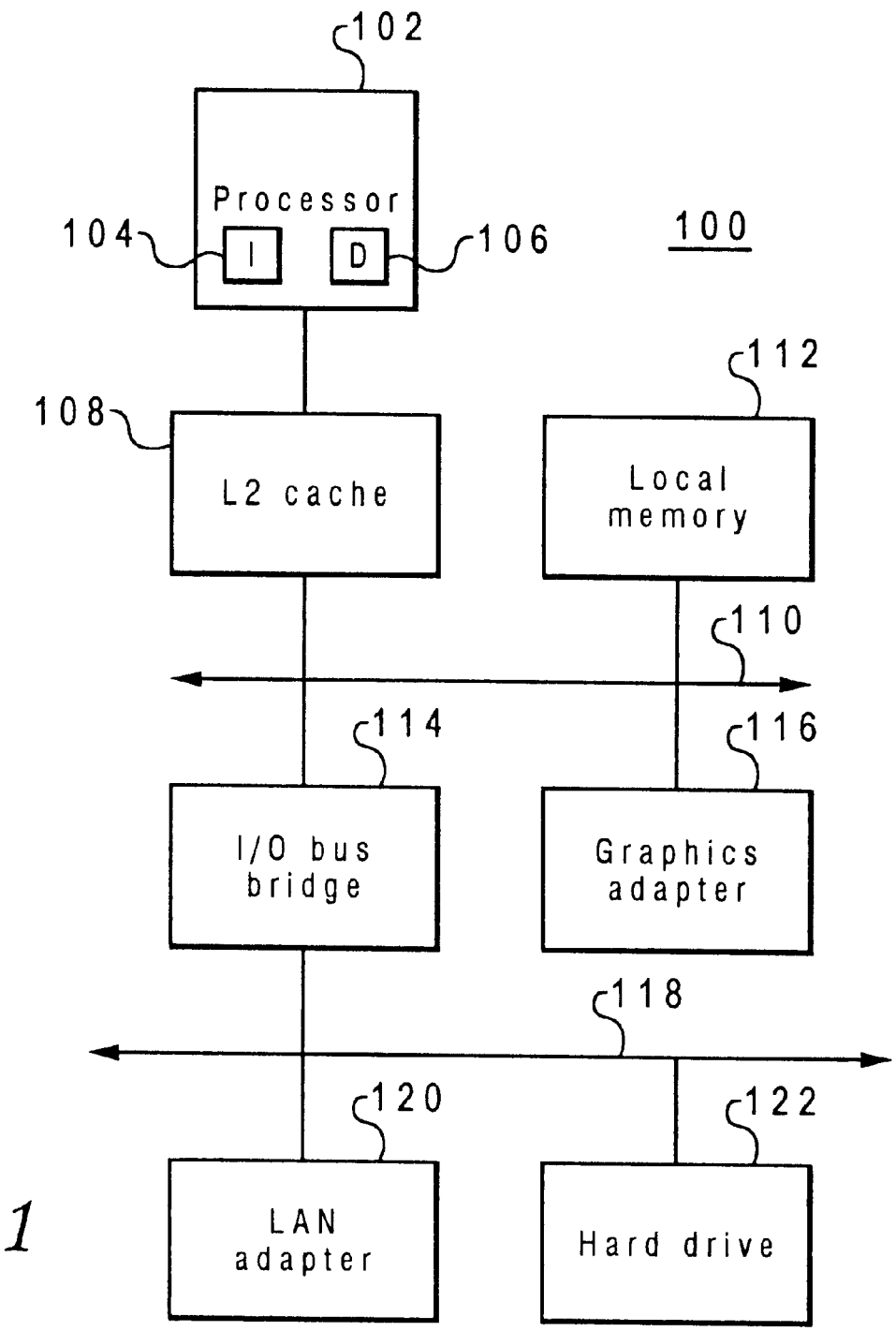
FIG. 1 depicts a data processing system within which a preferred embodiment of the present invention may be implemented.

With reference now to the figures, and in particular with reference to FIG. 1, a block diagram of a data processing system in which a preferred embodiment of the present invention may be implemented is depicted. Data processing system 100 may include only a single processor or may be a symmetric multiprocessor (SMP) system including a plurality of processors. A single processor system is shown in the example depicted. Processor 102 may be a superscalar reduced instruction set computing (RISC) processor including separate level one instruction and data caches 104 and 106 within the processor. A PowerPC™ processor may be utilized for processor 102.

Processor 102 is connected to a combined level two (L2) cache 108. L2 cache 108 is connected to system bus 110 for data processing system 100. Local memory 112 is also connected to system bus 110, as is I/O bus bridge 114. Other devices, such as memory-mapped graphics adapter 116, may also be connected to system bus 110. I/O bus bridge 114 is connected to I/O bus 118, which may be connected to a variety of other devices such as local area network (LAN) adapter 120 and hard disk drive 122.

Those of ordinary skill in the art will appreciate that the hardware depicted in FIG. 1 may vary. For example, other peripheral devices, such as optical disk drive and the like also may be used in addition or in place of the hardware depicted. The depicted example is not meant to imply architectural imitations with respect to the present invention.

In particular, a data processing system need not be limited to a single processor as shown in the depicted example to benefit from the present invention. The present invention may be employed, for example, to improve the performance of a data processing system having two processors, each with a corresponding L2 cache.

Figure 2:
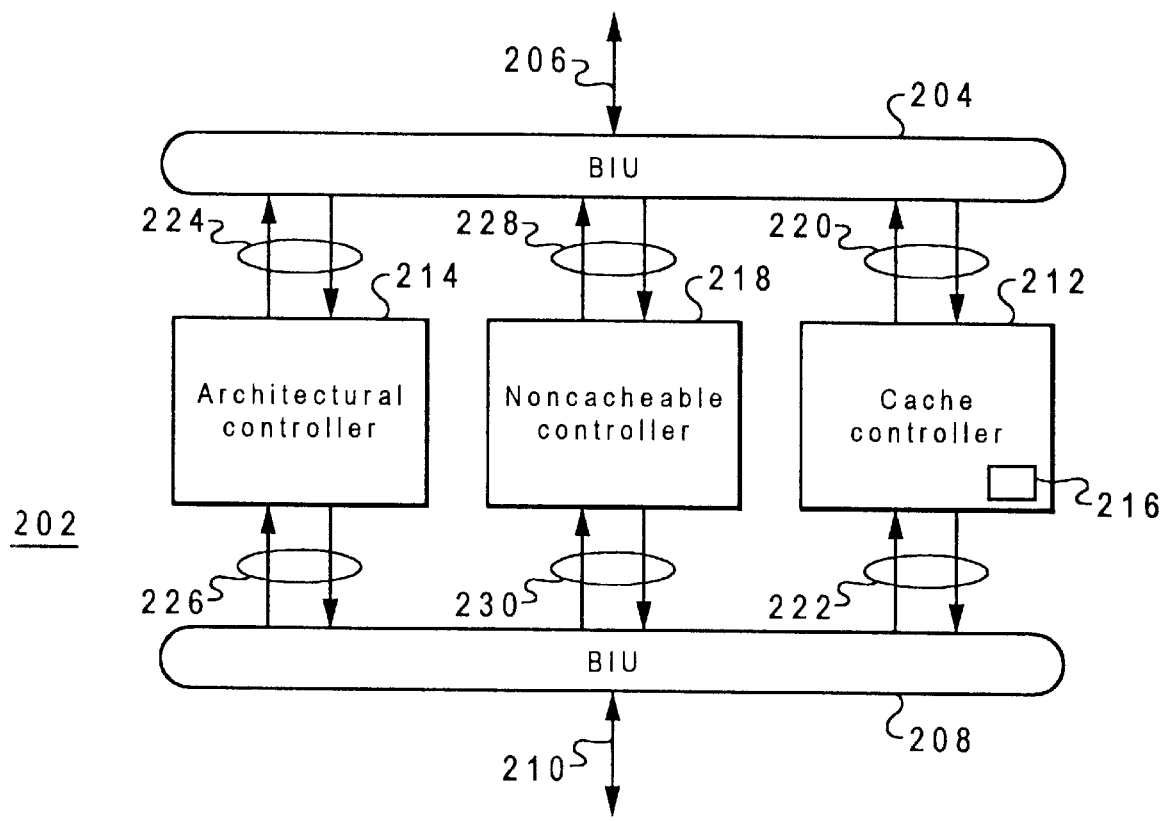
FIG. 2 is a block diagram of a controller within a data processing system in accordance with a preferred embodiment of the present invention.

Referring to FIG. 2, a block diagram of a controller within a data processing system in accordance with a preferred embodiment of the present invention is illustrated. Controller 202 is implemented within cache 108 depicted in FIG. 1. Controller 202 includes a bus interface unit (BIU) 204 connected to an upper bus 206 for a processor or a higher level cache, and a bus interface unit 208 to a lower bus 210, which may be a system bus or a bus to another cache. Upper bus 206 and lower bus 210 may differ; upper bus 206 may be, for example, a 60X bus, while lower bus 210 may be a different bus.

Cache and architectural specific functions within controller 202 are layered. Thus, controller 202 includes cache controller 212 and architectural controller 214. Operations are distinguished as "cache" or "architectural" operations. Only cache operations are handled by cache controller 212, and only cache controller 212 performs operations on cache 216. Architectural operations are handled by architectural controller 214 and are seen by cache controller 212 as system-side operations.

A third unit, noncacheable controller 218, is also contained within cache controller 202. Noncacheable controller 218 is actually a counterpart to cache controller 212 in that it also handles only cache operations. Whereas cache controller 212 handles cache operations directed at cache memory locations, noncacheable controller 218 handles cache operations directed at memory locations which do not map to cache 216. It is advantageous, for reasons known to those skilled in the art, to treat part of the system memory as noncacheable. Such memory may be utilized, for example, by memory mapped devices. While cache controller 212 operates on full cache blocks, noncacheable controller 218 operates on smaller memory segments, typically less than 8–16 bytes. Moreover, noncacheable controller 218 does not store data, while cache controller 212 retains copies of data handled within cache 216.

Cache operations are typically those operations which read or write values to memory locations, and therefore may change or retrieve the value of data in a memory location. Remaining operations are defined as architectural operations. Unlike cache operations, architectural operations generally do not change the value of data in a memory location. An architectural operation may move the data to a different location within the cache hierarchy, change the status of data in a particular memory location, or perform other such functions. However, architectural operations generally do not directly alter the value of data within a memory location.

Cache operations, supported by cache controller 212, comprise the largest majority of operations affecting the system cache. Within the complete set of operations supported by a given processor, cache operations may not derive from the portion of the instruction set which is most frequently executed and/or consume the largest majority of processor cycles. However, disregarding instructions directed to other functional units within the processor, such as the floating point, fixed point, or branch units, cache operations are, collectively, executed most often and utilize the largest measure of time.

The remaining operations affecting a system cache—those employed for cache management, operating system management, page management, and synchronization, etc.—are layered out and supported by architectural controller 214. Virtually all processor architectures support such operations, which are utilized in real time operation much less frequently than cache operations. Additionally, individual operations among the architectural operations are generally implemented, if at all, in substantially divergent manners for different processors of interest. Processor-side architectural operations pass through architectural controller 214 to system bus 210 and affects cache controller 212 as apparent system-side architectural operations.

Different designs may vary the set of operations supported by the cache controller and, by default, the remaining operations layered for support by the architectural controller. However, increasing the number of operations supported by the cache controller increases the complexity of logic required. Additionally, if instructions selected for support by the cache controller are not supported by all processors of interest, the cache controller design loses its direct transferability to new controller designs.

While certain operations pass down only one path within controller 202—that is, through architectural controller 214 or cache controller 212—other operations are split and pass down both paths. Cache controller 212 employs a pass-through design, in which operations initiated at interface 220 generate a response at interface 222 while operations initiated at interface 222 produce a responsive action at interface 220.

Because cache and architectural operations are layered within controller 202, bus transactions and protocols may also be layered. That is, generic interfaces may be defined for cache controller 212, architectural controller 214, and noncacheable controller 218. Thus, interfaces 220–230 comprise generic protocol interfaces to bus interface units 204 and 208 which are, to the extent possible, not architecturally specific. This decouples the design for cache controller 212 from the specific protocols of bus 206 and bus 210, allowing the design for cache controller 212 to be reused. It is virtually impossible, however, to design generic interfaces without layering cache and architectural specific functions to separate complexities.

In contrast to traditional cache controllers, cache controller 212 may thus be implemented in a manner independent of the two buses 206 and 210, responding only to cache operations. Although such cache operations are initiated by transactions on either bus 206 or bus 210, only certain bus transactions will prompt a response within cache controller 212. In a preferred embodiment, cache controller 212 only responds to instruction fetch operations (IFETCH), LOAD operations, and WRITE operations on bus 206, and to READ operations, WRITE operations, and traditional SNOOPS on bus 210. This results in substantially simplified design requirements for cache controller 212. This is accomplished by avoiding the usual practice of overlaying the highly irregular (semantically and temporally) architectural operations and cache operations. The burden of responding to the architectural operations is removed from the design of cache controller 212 and placed in architectural controller 214.

The cache operations handled by cache controller 212 are supported by every commercial processor of interest in substantially the same form. Only minor differences in specific implementation, from which cache controller 212 in the present invention is decoupled by generic interfaces 220 and 222, distinguish comparable instructions for different processors of interest.

By layering selected cache and architectural functions, and implementing generic interfaces to bus interface units 204 and 208, a large portion of the overall design of controller 202 may be directly transferred to new implementations for different processors. The cache controller logic may be reused without modification for the cache operations. New sleeves of logic for the bus interface units may be easily implemented for handling new bus protocols and converting the generic protocol interfaces 220–230 of cache, architectural, and noncacheable controllers 212, 214, and 218 to interfaces for bus 206 and bus 210. The most significant effort for implementing a design supporting a different processor is required by the architectural controller. Individual design of the logic supporting the architectural operations is required in any case since processor architectures vary dramatically. Overall, however, a significant savings in design effort for different processors may be achieved since only the semantics of operations handled by architectural controller 214 will change.

By layering cache and architectural functions, limiting cache controller 212 to responding to a few fundamental operations, the cache controller logic is greatly streamlined and simplified. In addition, the architectural controller logic is also simplified since, by separating the two classes of operations, issues of interrelationships between operations in different classes are eliminated. The cache and architectural controllers may be designed as individual units.

Bus interface units 204 and 208 are responsible for managing transactions and protocols to bus 206 and system bus 210. If generic interfaces are defined for interfaces 220–230, the designs for controllers 212, 214, and 218 may be isolated from specific bus architectures. Bus interface units 204 and 208 translate the specific bus transactions into the protocol for the generic interfaces 220–230. Controllers 212, 214, and 218 are then independent, insulated from changes in bus protocols or processors.

In defining the generic interfaces, the interfaces from a given bus interface unit 204 or 208 to each of controllers 212, 214, and 218 will differ, especially when bus 206 differs from 210. Similarly, interfaces between any specific controller 212, 214, or 218 to each bus interface unit 204 and 208 will differ. Thus, each set of interfaces 220–230 will be different. The interfaces are generic because they are designed to handle any operation outside the BIUs by translating the operation to a generic protocol. The essential essence of the bus operation is extracted from the bus protocol and communicated to the controllers by the BIUs through the generic interfaces.

To define generic interfaces 220–230, a generic protocol must be extracted from the operations passed through the interface. Regardless of differences in bus or processor architectures, common threads may be ascertained within equivalent operations. READs and WRITEs, for example, always work in essentially the same manner, but perhaps with timing or duration differences that are hidden by the BIUs or managed in the details of the individual generic protocols.

Figure 3:
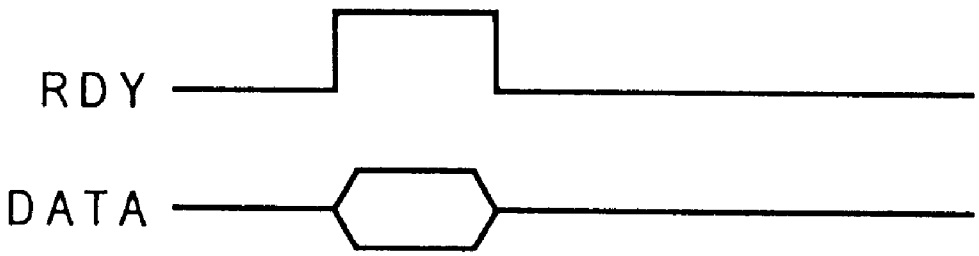
FIG. 3 depicts timing diagrams for variants of generic interfaces within a controller in accordance with a preferred embodiment of the present invention.
Figure 3:
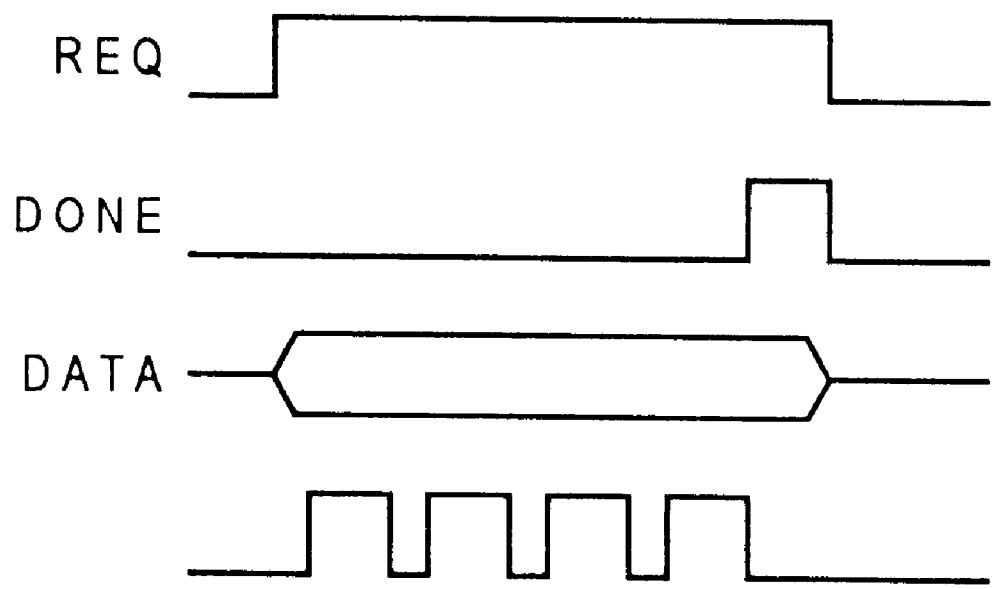

With reference now to FIG. 3, timing diagrams for variants of generic interfaces within a controller in accordance with a preferred embodiment of the present invention are depicted. For a "pulsed" interface, the bus interface unit is responsible for gathering all of the information relevant to an operation and packaging that information into a packet. The bus interface unit then transmits a ready signal (RDY) and sends the information for the operation in a single packet. Pulsed interfaces are best suited for operations in which all of the relevant information becomes available quickly, in a relatively short span of time. The collected information is transmitted efficiently, often in a single cycle. A noncacheable STORE is an example of an operation which is suitable for a pulsed interface, since the processor will quickly produce all the information required for the operation.

A "held" interface typically involves a request signal (REQ) which is asserted for some period of time. Information relevant to the requested operation—qualifying information such as address or field codes—has been previously assembled by the source. A variety of other signals are exchanged between the source and the target to control the data transfer. A done signal (DONE) terminates the exchange. Held interfaces are best suited for operations which have an unbounded nature, such as those which may require a long and potentially variable amount of time. An example is a READ operation, which can take a arbitrary amount of time that cannot be controlled.

Those skilled in the art will recognize that other interfaces besides the pulsed and held interfaces described will be suitable for implementing the generic interfaces within a controller layered into cache and architectural specific functions, including variations of the interfaces described. For example, instead of an explicit DONE signal, the signal may be implicit from other control signals. The most suitable interface will be driven by the character of operation for which the interface is being implemented.

Referring again to FIG. 2 each of interfaces 220–230 is actually a group of interfaces. Interface set 220, for example, includes at least one distinct interface for each operation which will be passed between BIU 204 and cache controller 212. For performance reasons, multiple replications of an interface for a specific operation may be included within a particular interface set. Interfaces for specific operations will be implemented based on the type of operation and the suitability of pulsed, held, or other interfaces as described above.

Figure 4:
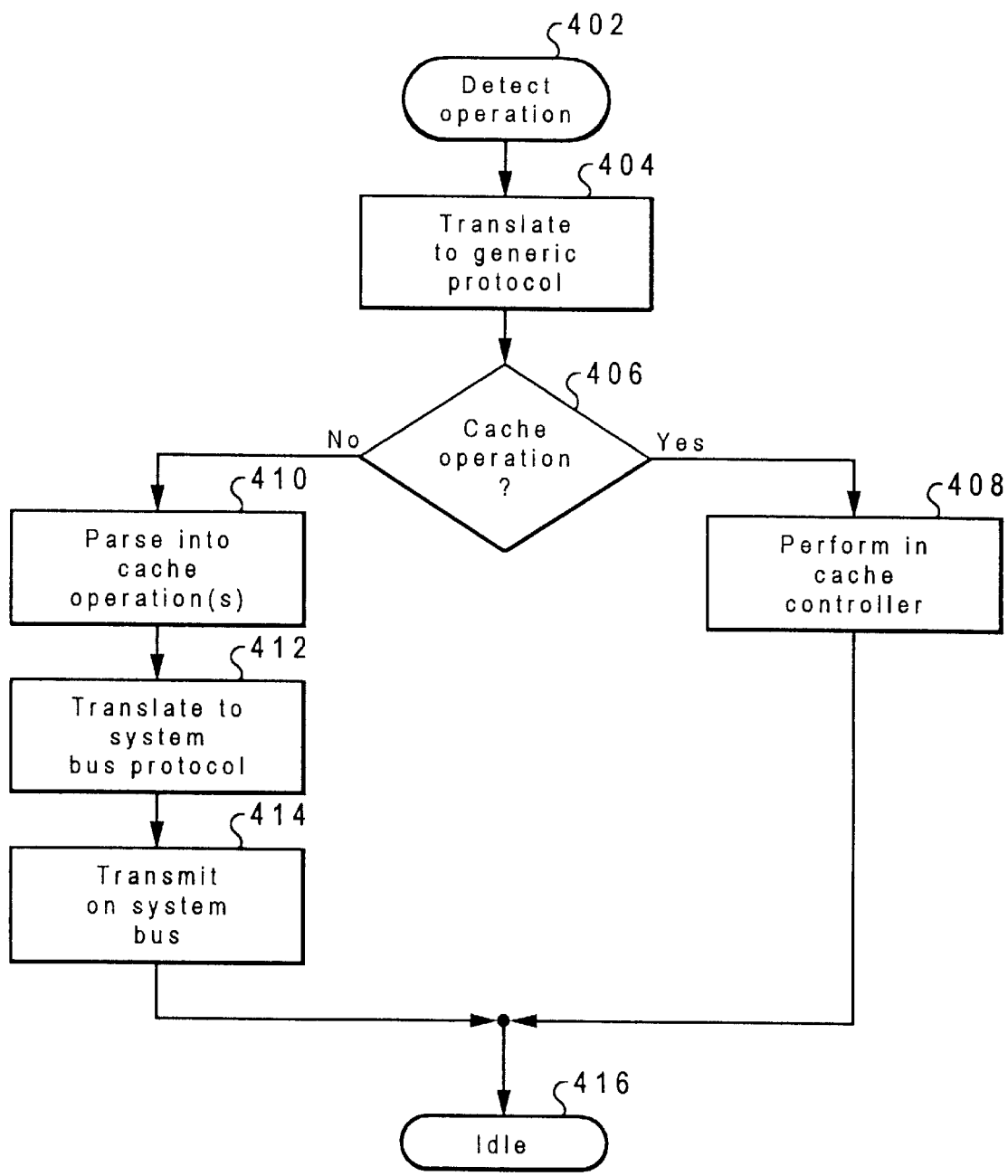
FIG. 4 is a high level flowchart for a process of employing generic interfaces within a controller layered into cache and architectural specific functions in accordance with a preferred embodiment of the present invention.
Figure 5:
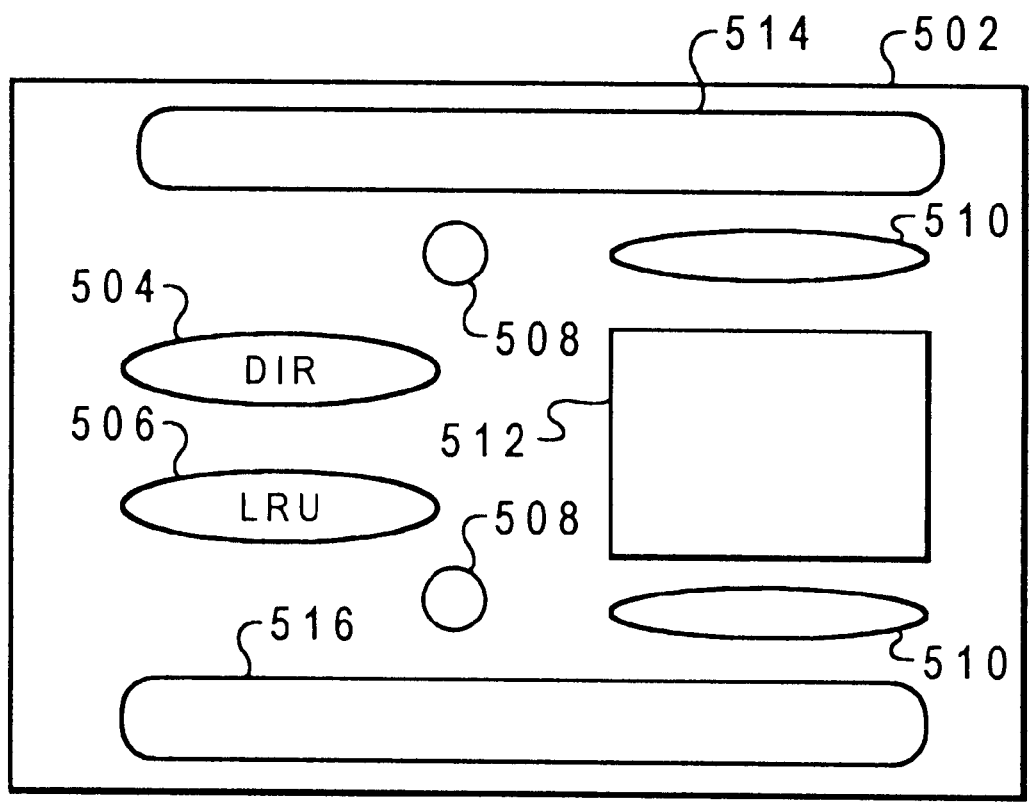
FIG. 5 depicts a block diagram of a prior art cache controller.

Referring to FIG. 4, a high level flowchart for a process of employing generic interfaces within a controller layered into cache and architectural specific functions in accordance with a preferred embodiment of the present invention is depicted. The process may be performed in a controller layered into cache and architectural specific operations and including generic interfaces to the cache and architectural controllers.

The process begins at step 402, which depicts detecting an operation on the processor bus. The process then passes to step 404, which illustrates translation of the operation into the generic protocol employed by one of the generic interfaces, and to step 406, which depicts a determination of whether the instruction is a cache operation or an architectural operation. Although depicted separately, steps 404 and 406 will overlap since the nature of the operation must be determined to translate the operation for the appropriate interface.

If the operation is a cache operation, the process proceeds to step 408, which illustrates performing the operation in the cache controller. The process then passes to step 416, which depicts the process becoming idle until another operation is detected. Referring again to step 406, if the operation is not a cache operation the process proceeds instead to step 410, which depicts parsing the operation into cache operations, and then to step 412, which depicts translating the cache operations into the system bus protocol. Steps 410 and 412 may overlap.

The process then passes to step 414, which illustrates transmitting the cache operations on the system bus. The process next passes to step 416, which depicts the process becoming idle until another operation is detected.

The process described relates to operation of a bus interface unit on the processor side of the controller. A similar process occurs on the system bus side of the controller, but requiring only steps 402, 404 and 406.

The present invention provides the ability to insulate controller logic designs from changes in protocols and/or processors by allowing generic interface to be utilized in connection with layered cache and architectural operations. This is not possible under the prior art approach of overlaying the semantic and temporal complexities of architectural opertions with simpler cache operations. Architectural operations exhibit an irregular temporal behavior, with the same operation requiring a variable amount of time in different instances. Architectural operations also typically require support for special cases. The more interrelated architectural and cache operations are, the more difficult it becomes to define generic interfaces and achieve the associated benefits.

The present invention also divides complexities between appropriate segments of the controller, moving them to appropriate places. Each segment of the controller thus has a well-defined job within a well-defined interfaces. This divide-and-conquer approach layers design efforts into more manageable, relatively autonomous units.

While the invention has been particularly shown and described with reference to a preferred embodiment, it will be understood by those skilled in the art that various changes in form and detail may be made therein without departing from the spirit and scope of the invention.

What is claimed is:

1. A method of employing generic interfaces in a controller, comprising:
   receiving a bus operation in a specific protocol at a bus interface unit for a storage device, wherein the bus operation targets data within the storage device;
   translating the bus operation into a generic protocol employed by a generic interface for a plurality of controller logic units within the storage device, wherein each controller logic unit within the plurality of controller logic units performs a different category of operations on data within the storage device;
   determining whether the bus operation is
      a cache operation requiring either a read of data within the storage device for return to a device requesting the bus operation or a write of data from the bus operation to a memory location within the storage device, or
      an architectural operation moving data to a different location within the storage device or chancing a status of data within the storage device:
   transmitting the translated bus operation to either a first controller logic unit within the plurality of controller logic units which performs cache operations within the storage device or a second controller logic unit within the plurality of controller logic units which performs architectural operations within the storage device for performance.

2. The method of claim 1, wherein the step of translating the bus operation into a generic protocol employed by a generic interface for a plurality of controller logic units within the storage device further comprises:
   translating the bus operation from a processor bus protocol to the generic protocol.

3. The method of claim 1, wherein the step of translating the bus operation into a generic protocol employed by a generic interface for a plurality of controller logic units within the storage device further comprises:
   translating the bus operation from a system bus protocol to the generic protocol.

4. The method of claim 1, wherein the step of determining whether the bus operation is a cache operation requiring either a read of data within the storage device for return to a device requesting the bus operation or a write of data from the bus operation to a memory location within the storage device, or an architectural operation moving data to a different location within the storage device or changing a status of data within the storage device further comprises:
   determining whether the bus operation is an instruction fetch operation, a load operation, a read operation, or a write operation.

5. The method of claim 1, wherein the step of determining whether the bus operation is a cache operation requiring either a read of data within the storage device for return to a device requesting the bus operation or a write of data from the bus operation to a memory location within the storage device, or an architectural operation moving data to a different location within the storage device or changing a status of data within the storage device further comprises:
   determining whether the bus operation is an cache management operation, an operating system management operation, a page management operation, or a synchronization operation.

6. A method of employing generic interfaces in a controller, comprising:

receiving a bus operation to be performed for data within a storage device in a specific protocol at a bus interface unit for the storage device;

determining whether the bus operation is a cache operation requiring either a read of data within the storage device for return to a device initiating the bus operation or a write of data from the bus operation to a memory location within the storage device; and responsive to determining that the bus operation is a cache operation, translating the bus operation into a generic protocol employed by a generic interface for a cache controller within the storage device, wherein the cache controller performs only cache operations targeting data within the storage device.

7. The method of claim 6, further comprising:

determining whether the bus operation is an architectural operation moving data to a different location within the storage device or changing a status of data within the storage device; and responsive to determining that the bus operation is an architectural operation, transmitting the bus operation to an architectural controller within the storage device to be performed, wherein the architectural controller performs only architectural operations targeting data within the storage device.

8. The method of claim 7, further comprising:

determining whether the bus operation is a cache operation targeting a noncacheable memory location within the storage device; and responsive to determining that the bus operation is a cache operation targeting a noncacheable memory location within the storage device, translating the bus operation into the generic protocol employed by a generic interface for a noncacheable controller within the storage device, wherein the noncacheable controller performs only cache operations targeting noncacheable memory locations within the storage device, and transmitting the translated bus operation to the noncacheable controller to be performed.

9. The method of claim 8, wherein the step of determining whether the bus operation is a cache operation requiring either a read of data within the storage device for return to a device initiating the bus operation or a write of data from the bus operation to a memory location within the storage device further comprises:

determining whether the bus operation is an instruction fetch operation, a load operation, a read operation, or a write operation.

10. The method of claim 9, wherein the step of determining whether the bus operation is an architectural operation moving data to a different location within the storage device or changing a status of data within the storage device further comprises:

determining whether the bus operation is an cache management operation, an operating system management operation, a page management operation, or a synchronization operation.

11. The method of claim 10, wherein the step of translating the bus operation into a generic protocol employed by a generic interface for a cache controller within the storage device further comprises:

translating the bus operation from a processor bus protocol to the generic protocol.

12. The method of claim 10, wherein the step of translating the bus operation into a generic protocol employed by a generic interface for a cache controller within the storage device further comprises:

translating the bus operation from a system bus protocol to the generic protocol.

13. The method of claim 6, further comprising:

transmitting the translated bus operation to the cache controller to be performed.

14. A method of employing generic interfaces in a controller, comprising:

receiving a bus operation to be performed for data within a storage device in a specific protocol at a bus interface unit for the storage device;

determining whether the bus operation is a cache operation requiring either a read of data within the storage device for return to a device initiating the bus operation or a write of data from the bus operation to a memory location within the storage device;

responsive to determining that the bus operation is a cache operation, translating the bus operation into a generic protocol employed by a generic interface for a cache controller within the storage device, wherein the cache controller performs only cache operations targeting data within the storage device, and transmitting the translated bus operation to the cache controller to be performed;

determining whether the bus operation is an architectural operation moving data to a different location within the storage device or changing a status of data within the storage device; and responsive to determining that the bus operation is an architectural operation, transmitting the bus operation to an architectural controller within the storage device to be performed, wherein the architectural controller performs only architectural operations targeting data within the storage device.

15. The method of claim 14, further comprising:

determining whether the bus operation is a cache operation targeting a noncacheable memory location within the storage device; and responsive to determining that the bus operation is a cache operation targeting a noncacheable memory location within the storage device, translating the bus operation into the generic protocol employed by a generic interface for a noncacheable controller within the storage device, wherein the noncacheable controller performs only cache operations targeting noncacheable memory locations within the storage device, and transmitting the translated bus operation to the noncacheable controller to be performed.

16. The method of claim 14, wherein the step of determining whether the bus operation is a cache operation requiring either a read of data within the storage device for return to a device initiating the bus operation or a write of data from the bus operation to a memory location within the storage device further comprises:

determining whether the bus operation is an instruction fetch operation, a load operation, a read operation, or a write operation.

17. The method of claim 14, wherein the step of determining whether the bus operation is an architectural operation moving data to a different location within the storage device or changing a status of data within the storage device further comprises:

determining whether the bus operation is an cache management operation, an operating system management operation, a page management operation, or a synchronization operation.

18. The method of claim 14, wherein the step of translating the bus operation into a generic protocol employed by a generic interface for a cache controller within the storage device further comprises:

translating the bus operation from a processor bus protocol to the generic protocol.

19. The method of claim 14, wherein the step of translating the bus operation into a generic protocol employed by a generic interface for a cache controller within the storage device further comprises:

translating the bus operation from a system bus protocol to the generic protocol.

20. The method of claim 14, further comprising:

receiving a result of the bus operation within the cache controller at the generic interface in the generic protocol; and translating the result from the generic protocol to the specific protocol.

* * * * *